US012788071B2

(12) United States Patent
Li et al.

(10) Patent No.: US 12,788,071 B2
(45) Date of Patent: Nov. 10, 2026

(54) TOBACCO HEATING APPARATUS AND AEROSOL GENERATION METHOD THEREFOR

(71) Applicants: ZHENGZHOU TOBACCO RESEARCH INSTITUTE OF CNTC, Zhengzhou City (CN); CHINA TOBACCO YUNNAN INDUSTRIAL CO. LTD., Kunming City (CN)

(72) Inventors: Bin Li, Zhengzhou City (CN); Jianguo Tang, Zhengzhou City (CN); Lili Fu, Zhengzhou City (CN); Zhiqiang Li, Zhengzhou City (CN); Ke Zhang, Zhengzhou City (CN); Shanzhai Shang, Zhengzhou City (CN); Shuang Wang, Zhengzhou City (CN); Xiaoxiang Liao, Zhengzhou City (CN); Le Wang, Zhengzhou City (CN); Ping Lei, Zhengzhou City (CN); Bing Wang, Zhengzhou City (CN); Jingmei Han, Zhengzhou City (CN)

(73) Assignee: ZHENGZHOU TOBACCO RESEARCH INSTITUTE OF CNTC (CN)

( * ) Notice: Subject to any disclaimer, the term of this patent is extended or adjusted under 35 U.S.C. 154(b) by 551 days.

(21) Appl. No.: 18/265,198

(22) PCT Filed: Apr. 16, 2021

(86) PCT No.: PCT/CN2021/087618

§ 371 (c)(1),
(2) Date: Jun. 2, 2023

(87) PCT Pub. No.: WO2022/116465

PCT Pub. Date: Jun. 9, 2022

(65) Prior Publication Data

US 2024/0000156 A1 Jan. 4, 2024

(30) Foreign Application Priority Data

Dec. 4, 2020 (CN) ......................... 202011409679.1

(51) Int. Cl.
*A24F 40/57* (2020.01)
*A24D 1/20* (2020.01)
(Continued)

(52) U.S. Cl.
CPC ................ *A24F 40/57* (2020.01); *A24D 1/20* (2020.01); *A24F 40/20* (2020.01); *A24F 40/46* (2020.01); *A24F 40/51* (2020.01); *H05B 6/108* (2013.01)

(58) Field of Classification Search
None
See application file for complete search history.

(56) References Cited

U.S. PATENT DOCUMENTS

2008/0149118 A1* 6/2008 Oglesby .................. A24F 42/10 131/194
2018/0289062 A1 10/2018 Lopez
2019/0059448 A1* 2/2019 Talon .................. H05B 1/0244

FOREIGN PATENT DOCUMENTS

CN 109007976 A * 12/2018 ........... A24F 47/008
CN 109330027 A 2/2019
(Continued)

OTHER PUBLICATIONS

Translation of WO 2020/202254 (Year: 2020).*
(Continued)

*Primary Examiner* — Cynthia Szewczyk
(74) *Attorney, Agent, or Firm* — FBT Gibbons LLP

(57) ABSTRACT

An aerosol generation method of a tobacco heating apparatus. A tobacco heating apparatus comprises a smoking set (1) and a tobacco product (2), wherein the tobacco product (2) is arranged in the smoking set (1), the smoking set (1) heats
(Continued)

the tobacco product (2) by controlling the smoking set (1) on the basis of ignition point parameters of tobacco material, the tobacco product (2) includes a smoke extraction section (23) with a sidewall through-hole (24), and a sealing member (141) is provided between the smoking set (1) and the tobacco product (2), so as to ensure that air does not flow through tobacco materials when using, and it is ensured that the tobacco materials do not burn; and by obtaining a variation curve of an ignition point of the tobacco materials, and a heating program of the smoking set (1) is set closely following the variation curve the ignition point, thereby ensuring that the tobacco materials do not burn, and also ensuring that aroma substances of the tobacco materials are released to the maximum degree.

9 Claims, 3 Drawing Sheets

(51) Int. Cl.

| | |
|---|---|
| ***A24F 40/20*** | (2020.01) |
| ***A24F 40/46*** | (2020.01) |
| ***A24F 40/51*** | (2020.01) |
| ***H05B 6/10*** | (2006.01) |

(56) References Cited

FOREIGN PATENT DOCUMENTS

| | | | |
|---|---|---|---|
| CN | 109393576 | A | 3/2019 |
| CN | 109907371 | A | 6/2019 |
| CN | 209314945 | U | 8/2019 |
| CN | 111511230 | A | 8/2020 |
| WO | WO 2020/202254 | A1 | 10/2020 |

OTHER PUBLICATIONS

Translation of CN 109007976 (Year: 2018).*
"Ignition Point" Science Direct https://www.sciencedirect.com/topics/engineering/ignition-point (Year: 2026).*

* cited by examiner

TOBACCO HEATING APPARATUS AND AEROSOL GENERATION METHOD THEREFOR

CROSS-REFERENCE TO RELATED APPLICATIONS

This application is a U.S. National Phase Patent Application of International Application Number PCT/CN2021/087618, filed on Apr. 16, 2021, which claims priority to Chinese Patent Application Number 202011409679.1, filed on Dec. 4, 2020, the entire content of each of which is incorporated herein by reference.

FIELD OF THE INVENTION

The invention relates to the field of tobacco products, in particular to a heating tobacco apparatus and an aerosol generation method therefor.

BACKGROUND OF THE INVENTION

New tobacco products are emerging strategic tobacco products, and heated tobacco products are one of the products with great development prospects in this field. The working principle is that tobacco materials absorb heat from a heat source via heat transfer so as to produce aerosols. Using air as a carrier, the aerosols generated after the tobacco substrate is heated are delivered to the oral cavity for consumers to consume after certain modulation (such as cooling, flavoring, filtering, etc.). The heating program of the heat source has a great influence on the sensory quality of the heated tobacco products, which is able to control the release of key substances of the smoke by affecting the temperature distribution of the tobacco material of the heated cigarette.

At present, the heating program adopted by common heated cigarettes is a three-stage temperature control curve, showing a "high-low-high" temperature change trend (patent number: CN201380037681), and the maximum heating temperature of a smoking set is below 400° C., although it can be realized that the smoking set is heated without burning and aerosols are generated, the characteristic substances of tobacco materials are not completely released.

SUMMARY OF THE INVENTION

In order to overcome the existing defects, the present invention provides a tobacco heating apparatus and an aerosol generation method therefor.

A tobacco heating apparatus and an aerosol generation method therefor are provided. The tobacco heating apparatus includes a smoking set and a tobacco product. The tobacco product can be arranged in the smoking set. The smoking set heats the tobacco product by controlling the smoking set on the basis of an ignition point parameter of the tobacco material.

Optionally, the smoking set comprises a power module, a control module, and a cigarette accommodating cavity, wherein the power module is communicated with the control module, and the control module is communicated with the heating element coaxially arranged in the cigarette accommodating cavity.

Wherein, the tobacco product comprises a tobacco section and a functional mouthpiece section, wherein a smoke extraction section is also arranged between the tobacco section and the functional mouthpiece section, and the tobacco section, the functional mouthpiece section and the smoke extraction section are wrapped and connected together by an external wrapping material.

Wherein, the smoke extraction section is a column containing a cavity structure, and at least one sidewall through-hole communicated with the cavity structure is opened on a side wall of the column, a coaxial through-hole is formed on the external wrapping material in a position corresponding to the sidewall through-hole.

Wherein, a sealing member is provided in the cigarette accommodating cavity, when the tobacco product is inserted into the cigarette accommodating cavity, the sealing member seals the tobacco section of the tobacco product, so as to ensure that the external airflow cannot flow through the tobacco section; the heating element is close to the tobacco section.

Optionally, the heating element is one or more of cup-shaped, sheet-shaped or needle-shaped, and the cup-shaped heating element is arranged on the inner wall of the cigarette accommodating cavity, and sheet-shaped or needle-shaped heating elements is arranged on the central axis of the cigarette accommodating cavity.

The aerosol generation method comprises the following steps:

- activating the heating element to heat the tobacco section;
- obtaining a variation curve, a corresponding relationship, and a function with an oxygen concentration of the ignition point of the tobacco material of the tobacco section by a thermogravimetry method or a hot stage method, and storing them in a control circuit;
- obtaining a variation curve of the oxygen concentration over time (or with the times of suction) of the tobacco section through an off-line pre-set detection method, and storing it in the control circuit;
- calling an oxygen concentration variation data by the control circuit, and adjusting the power output to the heating element in real time according to the variation curve, the corresponding relationship and the function with the oxygen concentration of the ignition point of the tobacco material of the tobacco section, so as to ensure that the temperature of the heating element is close to and lower than the variation curve of the ignition point of the tobacco material.

Optionally, the smoking set may further comprises an oxygen content detection sensor, the control module is communicated with the oxygen content detection sensor, and the oxygen content detection sensor is communicated with the cigarette accommodating cavity through a micro air passage (15).

Optionally, the variation curve of the oxygen concentration over time (or with the times of suction) of the tobacco section can be obtained in real time by the oxygen content detection sensor.

Preferably, the heating element may be a circumferential heating cup, a central heating sheet, a central heating needle, an electromagnetic heating member, a microwave heating member, and the like.

The present invention provides a heating tobacco apparatus and an aerosol generation method therefor. First, the heating cigarette must ensure that the tobacco material does not burn during the process of using, and secondly, the more complete release of the aroma substances from the tobacco material, the better sensory quality thereof. The release amount of aroma substances is closely related to the heating temperature. By to obtaining the variation curve of the ignition point of the tobacco material and setting the heating program of the smoking set closely following the variation curve, it is possible to ensure that the tobacco material does not burn, and at the same time to ensure the maximum release of the aroma substances of the tobacco material.

BRIEF DESCRIPTION OF THE DRAWINGS

The above and other aspects and features of the present invention will be apparent from the following description of the embodiments with reference to the accompanying drawings, wherein.

DETAILED DESCRIPTION OF THE EMBODIMENTS

A tobacco heating apparatus and an aerosol generation method therefor provided by the present invention will be described in detail below with reference to the accompanying drawings and specific embodiments.

Example 1

Figure 1:
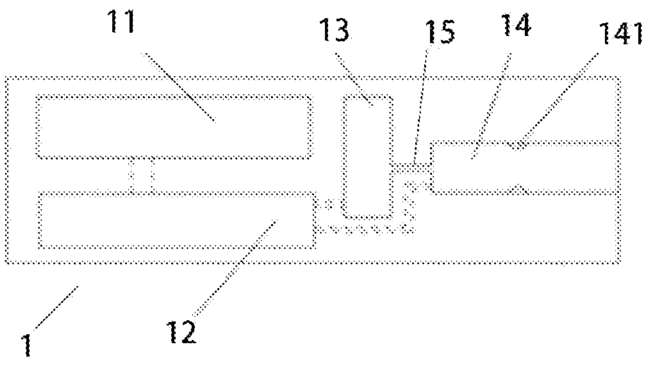
FIG. 1 is a schematic view of a smoking set device.
Figure 2:
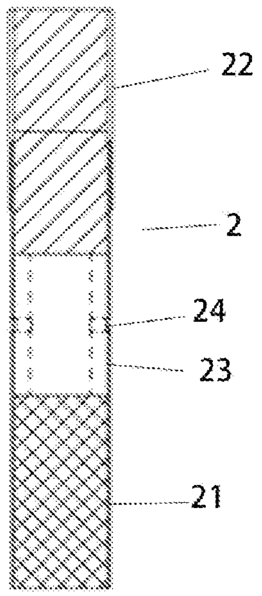
FIG. 2 is a schematic view of a tobacco product apparatus.
Figure 3:
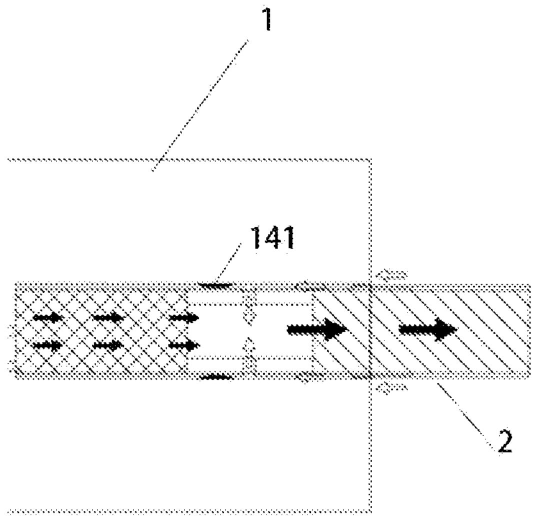
FIG. 3 is a schematic view of the airflow direction of the heated tobacco product.

FIGS. 1-3 show a tobacco heating apparatus and an aerosol generation method therefor. The tobacco heating apparatus includes a smoking set 1 and a tobacco product 2. The tobacco product 2 is arranged in the smoking set 1. The smoking set 1 heats the tobacco product 2 by controlling the smoking set 1 based on the parameters of the ignition point of the tobacco material.

The smoking set 1 includes a power module 11, a control module 12, and a cigarette accommodating cavity 14, wherein the power module 11 is communicated with the control module 12, and the control module 12 is communicated with a heating element coaxially arranged in the cigarette accommodating cavity 14.

The tobacco product 2 includes a tobacco section 21 and a functional mouthpiece section 22, wherein a smoke extraction section 23 is also arranged between the tobacco section 21 and the functional mouthpiece section 22, and the tobacco section 21, the functional mouthpiece section 22 and the smoke extraction sections 23 are wrapped and connected together through an external wrapping material.

The smoke extraction section 23 is a column containing a cavity structure, and at least one sidewall through-hole 24 communicated with the cavity structure is opened on the side wall of the column, and a coaxial through-hole is formed on the external wrapping material in a position corresponding to the sidewall through-hole 24.

A sealing member 141 is arranged in the cigarette accommodating cavity 14, and when the tobacco product 2 is inserted into the cigarette accommodating cavity 14, the sealing member 141 seals the tobacco section 21 of the tobacco product 2, so as to ensure that the external air flow cannot flow through the tobacco section 21. The heating element is in close proximity to the tobacco section 21.

The aerosol generation method comprises the following steps:

- activating the heating element to heat the tobacco section;
- obtaining the variation curve, the corresponding relationship, and the function with the oxygen concentration of the ignition point of the tobacco material of the tobacco section by a thermogravimetry method or a hot stage method, and storing them in the control circuit;
- obtaining the variation curve of the oxygen concentration over time (or with the times of suction) in the tobacco section through an off-line pre-set detection method, and storing in the control circuit;
- calling the oxygen concentration variation data by the control circuit, and adjusting the power output to the heating element in real time according to the variation curve, the corresponding relationship and the function with the oxygen concentration of the ignition point of the tobacco material of the tobacco section, so as to ensure that the temperature of the heating element is close to and lower than the variation curve of the ignition point of the tobacco material.

Example 2

The smoking set 1 may further include an oxygen content detection sensor 13, the control module 12 is communicated with the oxygen content detection sensor 13, and the oxygen content detection sensor 13 is communicated with the cigarette accommodating cavity 14 through a micro air passage 15.

The variation curve of the oxygen concentration over time (or with the times of suction) of the tobacco section can be obtained by the oxygen content detection sensor 13 in real time.

Figure 4:
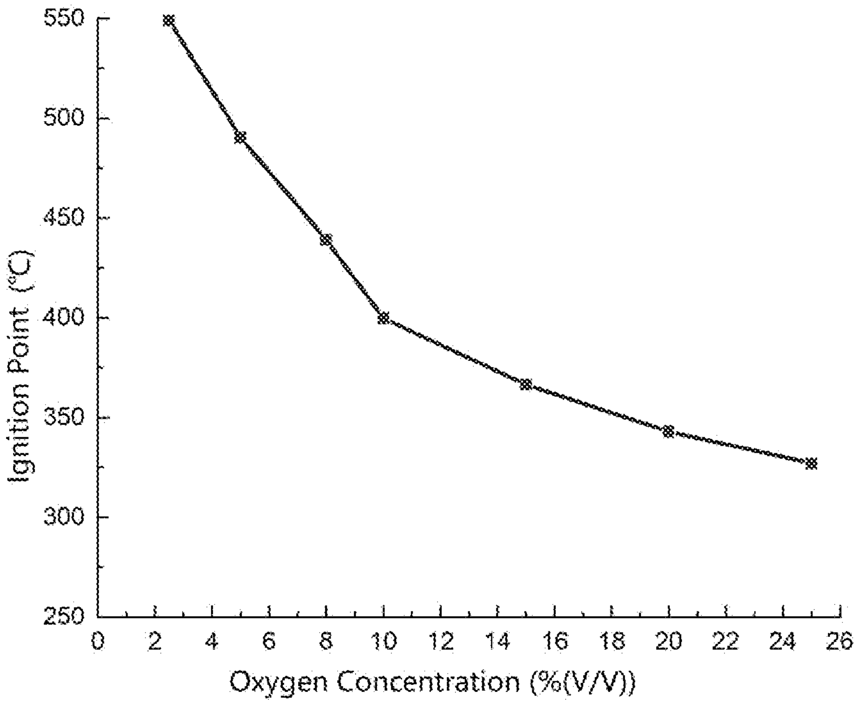
FIG. 4 is a schematic diagram of a curve presenting the ignition point varying with the oxygen concentration.
Figure 5:
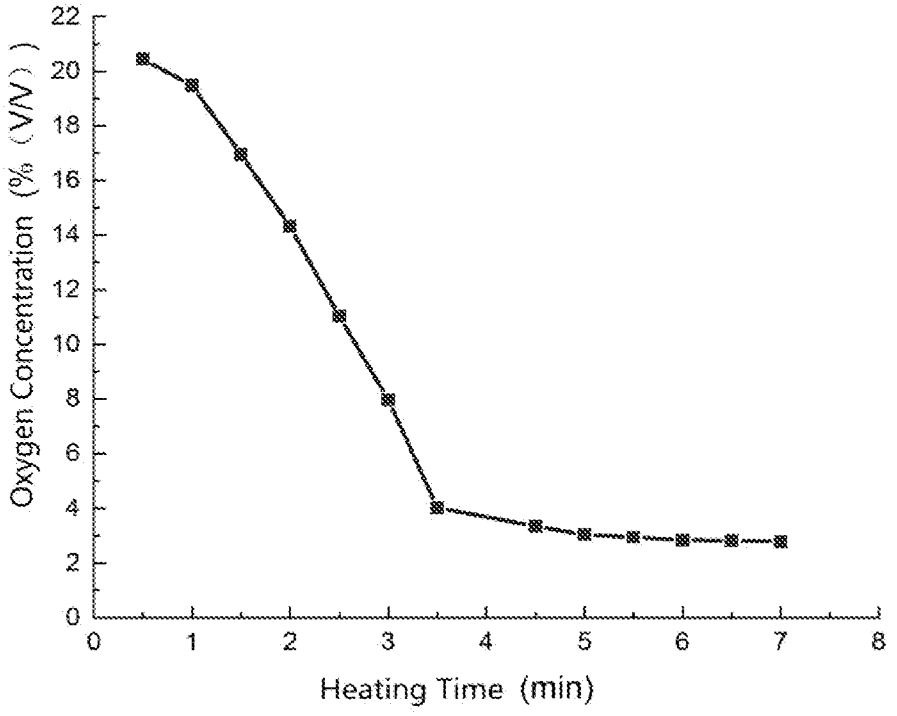
FIG. 5 is a schematic diagram of a curve presenting the oxygen concentration varying with the heating time.
Figure 6:
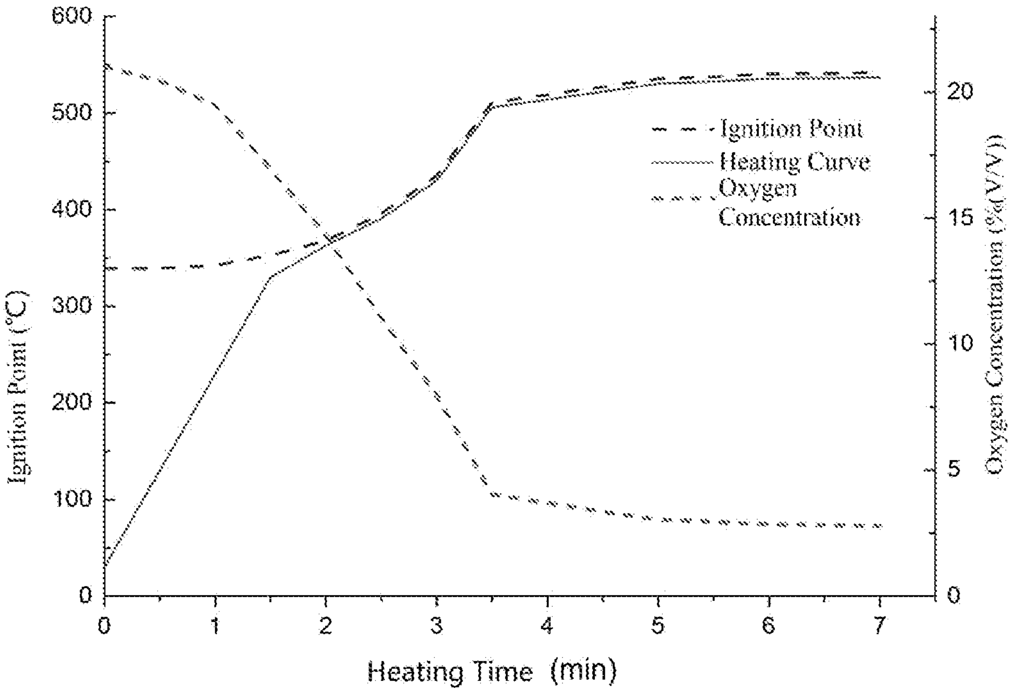
FIG. 6 is a schematic diagram of a heating curve of the smoking set.

As shown in FIGS. 4-6, under a certain state of the tobacco material, the ignition point of the tobacco material is varied with the change of the oxygen concentration. The heating curve of the smoking set is obtained by correlating the variation curve with the oxygen concentration of the ignition point and the variation curve of the oxygen concentration over time of the tobacco section of the cigarette.

The heating program (temperature raising program) of the heated tobacco product is set closely following the variation curve of the ignition point of the tobacco material, and the ordinate of a point corresponding to the abscissa of the heating program is slightly lower than the ordinate corresponding to the point with the same abscissa on the variation curve of the ignition point of the tobacco material, preferably lower by 5° C.

Table 1 shows the comparison of the release amount of key substances from the smoke, and Table 2 shows the comparison of residuals of key substances in tobacco sections after suction.

TABLE 1

| Heating curve | TPM (mg/cig) | Glycerol (mg/cig) | Nicotine (mg/cig) | Moisture (mg/cig) |
|---|---|---|---|---|
| The control of the ignition point | 47.98 | 13.53 | 2.69 | 11.63 |
| High-low-high | 40.25 | 10.49 | 2.12 | 9.30 |

TABLE 2

| Air flow mode | Glycerol (mg/cig) | Nicotine (mg/cig) |
| --- | --- | --- |
| NSC | ND (None detected) | ND (None detected) |
| HNB | 2.80 | 0.8 |

Through the CHI suction test, the release amount of key substances (TPM, glycerin, nicotine, moisture) in the smoke particulate matter under different heating curves is compared; the particulate matter is collected by using the Cambridge filter, the TPM is weighted after the suction is completed, and smoke substances (glycerin, nicotine, moisture) in the particulate matter is detected by using gas chromatography. Wherein, the extractant of glycerin is methanol, and the extractant of water and nicotine is isopropanol.

Table 1 and Table 2 show that, in the present invention, by obtaining a variation curve of the ignition point of the tobacco materials, and setting a heating program for the smoking set closely following the variation curve of the ignition point, the release amount of key substances from the tobacco section during the heating program is about 20% higher than that released from the tobacco section in a traditional "high-low-high" temperature raising and heating program. The key substances are released more sufficiently, and there is little residue of key substances in the tobacco section after smoking.

Finally, it should be noted that the above embodiments are only used to describe the technical solutions of the present invention rather than limit the technical methods thereof. The present invention can be extended to other modifications, changes, applications and embodiments in application, and therefore it is considered that all such modifications, changes, applications, and embodiments are all within the spirit and teaching scope of the present invention.

What is claimed is:

1. A tobacco heating apparatus, the tobacco heating apparatus comprises a smoking set and a tobacco product, characterized in that, the tobacco product can be arranged in the smoking set, said smoking set comprises a power module, a control module, an oxygen content detection sensor and a cigarette accommodating cavity, wherein the power module is communicated with the control module, the control module is communicated with the oxygen content detection sensor, and the control module is communicated with a heating element coaxially arranged in the cigarette accommodating cavity, said tobacco product comprises a tobacco section, said tobacco section contains tobacco material, a variation relationship of an ignition point of the tobacco material with an oxygen concentration within the tobacco section is stored in the control module of the smoking set, said control module is configured to call the variation relationship of the ignition point of the tobacco material with the oxygen concentration so as to adjust the power outputted to the heating element in real time and ensure that the temperature of the heating element is close to and lower than the variation curve of the ignition point of the tobacco material, thereby and the smoking set heats the tobacco product by controlling the smoking set on the basis of an ignition point parameter of a tobacco material of the tobacco product.

2. The tobacco heating apparatus according to claim 1, characterized in that, the tobacco product further comprises a functional mouthpiece section, wherein a smoke extraction section is also arranged between the tobacco section and the functional mouthpiece section, and the tobacco section, the functional mouthpiece section and the smoke extraction section are wrapped and connected together by an external wrapping material.

3. The tobacco heating apparatus according to claim 2, characterized in that, the smoke extraction section is a column containing a cavity structure, and at least one sidewall through-hole communicated with the cavity structure is opened on a side wall of the column, a coaxial through-hole is formed on the external wrapping material in a position corresponding to the sidewall through-hole.

4. The tobacco heating apparatus according to claim 2, characterized in that, a sealing member is provided in said cigarette accommodating cavity, when the tobacco product is inserted into the cigarette accommodating cavity, said sealing member seals a tobacco section of the tobacco product, so as to ensure that the external airflow cannot flow through the tobacco section; the heating element is close to the tobacco section.

5. The tobacco heating apparatus according to claim 2, characterized in that, the oxygen content detection sensor is communicated with the cigarette accommodating cavity through a micro air passage.

6. An aerosol generation method for the tobacco heating apparatus according to claim 2, wherein the aerosol generation method comprises the following steps:

activating the heating element to heat a tobacco section of the tobacco product;

obtaining a variation curve presenting the ignition point of the tobacco material of the tobacco section varied with an oxygen concentration, a corresponding relationship between the ignition point of the tobacco material of the tobacco section and the oxygen concentration as well as a heating time, and a function between the ignition point of the tobacco material of the tobacco section and the oxygen concentration as well as the heating time by a thermogravimetry method or a thermogravimetric method, and storing them in a control circuit;

obtaining a variation curve of the oxygen concentration over time (or with the times of suction) of the tobacco section through an offline pre-set detection method, and storing it in the control circuit;

calling an oxygen concentration variation data by the control circuit, and adjusting the power output to the heating element in real time according to the variation curve presenting the ignition point of the tobacco material of the tobacco section varied with the oxygen concentration, the corresponding relationship between the ignition point of the tobacco material of the tobacco section and the oxygen concentration as well as a heating time and the function between the ignition point of the tobacco material of the tobacco section and the oxygen concentration as well as the heating time, so as to ensure that the temperature of the heating element is close to and lower than the variation curve of the ignition point of the tobacco material.

7. The aerosol generation method for the tobacco heating apparatus according to claim 6, characterized in that, the variation curve of the oxygen concentration over time (or with the times of suction) of the tobacco section can be obtained in real time by the oxygen content detection sensor.

8. The tobacco tobacco apparatus according to claim 1, characterized in that, the heating element is one or more of cup-shaped, sheet-shaped or needle-shaped, wherein when the heating element is the cup-shaped heating element it is arranged on an inner wall of the cigarette accommodating cavity, and when the heating element is the sheet-shaped or needle-shaped heating element it is arranged on the central axis of the cigarette accommodating cavity.

9. The tobacco heating apparatus according to claim 8, characterized in that, the heating element is a circumferential heating cup, a central heating sheet, a central heating needle, an electromagnetic heating member, or a microwave heating member.

* * * * *